United States Patent
Hygren et al.

(10) Patent No.: US 11,456,947 B2
(45) Date of Patent: Sep. 27, 2022

(54) LINK AGGREGATION BASED ON ESTIMATED TIME OF ARRIVAL

(71) Applicant: Telefonaktiebolaget LM Ericsson (publ), Stockholm (SE)

(72) Inventors: Pierre Hygren, Sjömarken (SE); Per-Arne Thorsén, Öjersjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

(21) Appl. No.: 16/960,357

(22) PCT Filed: Jan. 31, 2018

(86) PCT No.: PCT/EP2018/052399
§ 371 (c)(1),
(2) Date: Jul. 7, 2020

(87) PCT Pub. No.: WO2019/149351
PCT Pub. Date: Aug. 8, 2019

(65) Prior Publication Data
US 2021/0067436 A1    Mar. 4, 2021

(51) Int. Cl.
*H04L 45/24*    (2022.01)
*H04L 43/106*    (2022.01)
(Continued)

(52) U.S. Cl.
CPC .......... *H04L 45/245* (2013.01); *H04L 43/106* (2013.01); *H04L 45/02* (2013.01);
(Continued)

(58) Field of Classification Search
CPC . H04L 45/245; H04L 45/745; H04L 45/7453; H04L 47/26; H04L 47/28;
(Continued)

(56) References Cited

U.S. PATENT DOCUMENTS

| 7,142,565 B2 | 11/2006 | Casaccia et al. |
| 7,924,798 B1 | 4/2011 | Brown et al. |

(Continued)

FOREIGN PATENT DOCUMENTS

| EP | 1701486 A1 | 9/2006 |
| EP | 2774412 A1 | 9/2014 |
| WO | 2013067433 A1 | 5/2013 |

OTHER PUBLICATIONS

IEEE Computer Society, "IEEE Standard for Local and Metropolitan Area Networks—Link Aggregation", IEEE Std 802.1AX—2008, Nov. 3, 2008, pp. 1-145, IEEE.

(Continued)

*Primary Examiner* — Pao Sinkantarakorn
(74) *Attorney, Agent, or Firm* — Coats & Bennett, PLLC

(57) ABSTRACT

The present disclosure relates to a communication arrangement (110, 130) adapted for link aggregation of a plurality of communication links (120a, 120b, 120c), comprised in an Aggregation Group, AG, (121). The communication arrangement (110, 130) is adapted to communicate via the plurality of communication links (120a, 120b, 120c) and comprises a traffic handling unit (112, 132) that is adapted to obtain data segments (414-423) to be transmitted, and to determine a risk of re-ordering of data segments within a certain data flow (401, 404) comprising a certain data segment (416, 417; 421). Said risk is associated with transmitting said certain data segment via a certain communication link out of the plurality of communication links (120a, 120b, 120c). The traffic handling unit (112, 132) is furthermore adapted to buffer said certain data segment (416, 417; 421) until the risk of re-ordering satisfies a predetermined criteria, prior to transmitting the said certain data segment (416, 417; 421) via the selected communication link.

16 Claims, 9 Drawing Sheets

(51) Int. Cl.
| | |
|---|---|
| *H04L 45/7453* | (2022.01) |
| *H04L 47/2483* | (2022.01) |
| *H04L 47/34* | (2022.01) |
| *H04L 47/41* | (2022.01) |
| *H04L 45/02* | (2022.01) |
| *H04W 72/12* | (2009.01) |
| *H04L 47/56* | (2022.01) |
| *H04L 47/625* | (2022.01) |

(52) U.S. Cl.
CPC .......... *H04L 45/24* (2013.01); *H04L 45/7453* (2013.01); *H04L 47/2483* (2013.01); *H04L 47/34* (2013.01); *H04L 47/41* (2013.01); *H04L 47/56* (2013.01); *H04W 72/12* (2013.01); *H04L 47/626* (2013.01)

(58) Field of Classification Search
CPC ....... H04L 47/283; H04L 47/32; H04L 47/34; H04L 47/41; H04L 47/56; H04L 47/625–6265
See application file for complete search history.

(56) References Cited

U.S. PATENT DOCUMENTS

| | | | |
|---|---|---|---|
| 9,059,932 B2 | 6/2015 | Schrum et al. | |
| 9,565,112 B2 | 2/2017 | Gale | |
| 2003/0198250 A1 | 10/2003 | Hakenberg et al. | |
| 2009/0116489 A1* | 5/2009 | Hanks | H04L 47/34 370/394 |
| 2010/0182920 A1 | 7/2010 | Matsuoka | |
| 2014/0233421 A1* | 8/2014 | Matthews | H04L 49/35 370/253 |
| 2016/0182380 A1* | 6/2016 | Mehra | H04L 45/7453 709/226 |
| 2017/0048147 A1* | 2/2017 | Vaidya | H04L 47/125 |
| 2018/0019942 A1 | 1/2018 | Liang et al. | |
| 2018/0098241 A1* | 4/2018 | Callard | H04L 47/34 |
| 2020/0007448 A1* | 1/2020 | Mizrahi | H04L 47/125 |

OTHER PUBLICATIONS

IEEE Computer Society, "Amendment to Carrier Sense Multiple Access with Collision Detection (CSMA/CD) Access Method and Physical Layer Specifications—Aggregation of Multiple Link Segments", Information Technology—Telecommunications and Information Exchange Between Systems—Local and Metropolitan Area Networks—Specific Requirements, IEEE Std 802.3ad-2000, Mar. 30, 2000, pp. 1-173, IEEE.

Thaler, D. et al., "Multipath Issues in Unicast and Multicast Next-Hop Selection", Network Working Group, RFC 2991, Nov. 1, 2000, pp. 1-9, NWG.

Evensen, K. et al., "A Network-Layer Proxy for Bandwidth Aggregation and Reduction of IP Packet Reordering", 2009 IEEE 34th Conference on Local Computer Networks (LCN 2009), Oct. 20, 2009, pp. 585-592, IEEE.

Prabhavat, S. et al., "Effective Delay-Controlled Load Distribution Over Multipath Networks", IEEE Transactions on Parallel and Distributed Systems, vol. 22 No. 10, Oct. 1, 2011, pp. 1730-1741, IEEE.

* cited by examiner

Fig 13
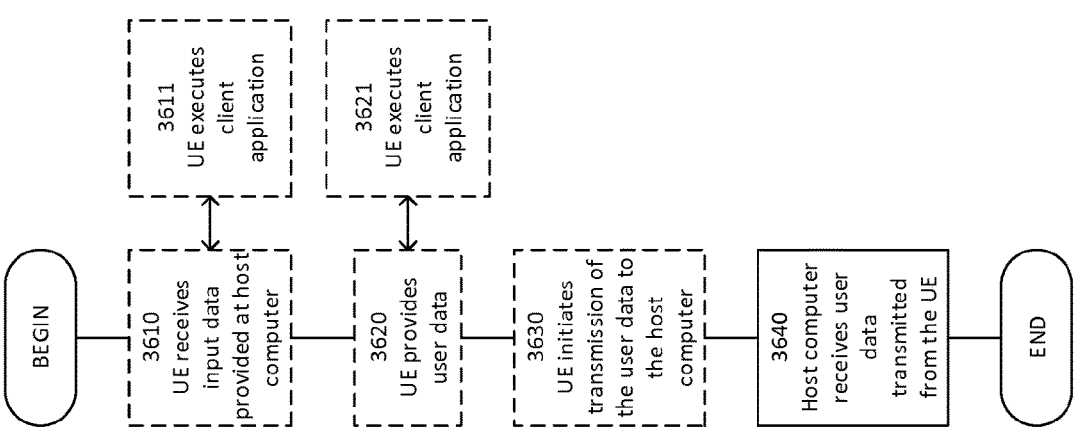
Fig 12
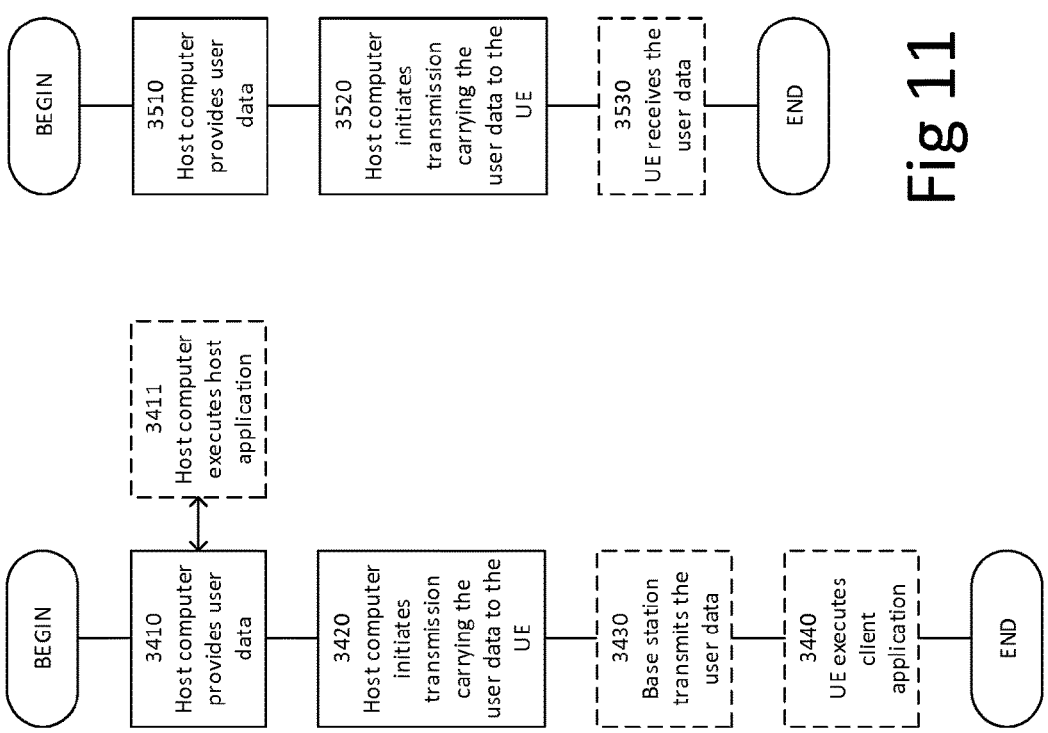
Fig 11
Fig 10

LINK AGGREGATION BASED ON ESTIMATED TIME OF ARRIVAL

TECHNICAL FIELD

The present disclosure relates to a communication arrangement adapted for link aggregation of a plurality of communication links, comprised in an Aggregation Group (AG). The communication arrangement is adapted to communicate via the plurality of communication links and comprises a traffic handling unit that is adapted to obtain data segments to be transmitted.

BACKGROUND

For communication links, it is known to aggregate two or more links to increase capacity of data transmission. Several ways exist to aggregate links to increase data bandwidth between two points in a network.

One way to do this is Communication link Bonding (CLB) which refers to layer one (L1) schemes, and is agnostic to layer two (L2) and higher protocol layers. Bonding means that different parts of the traffic are conveyed over different links and reassembled when received. If the links have different rates, the delays are different, implying buffering before reassembly when waiting for the subsequent parts of data to arrive over slower links. The link speed may also change arbitrarily between links due to, e.g., different susceptibility to external conditions for different carrier frequencies. Buffering is therefore often centralized and need to be dimensioned for a worst-case scenario. These schemes can be made very effective when it comes to making best use of the available spectrum resources.

There are also L2 and layer three (L3) link aggregation methods. A known such method is the IEEE 802.3ad Link Aggregation (LAG) standard, IEEE Std 802.1AX-2008 and Equal Cost Multipath (ECMP), RFC2991, where link/route allocation is performed based on flow identification assigned via higher protocol layer address fields.

L1 bonding works well from a spectrum efficiency stand point and can also handle varying link bandwidth well, but it suffers partly from complexity problems since forwarding of fragments over several links according to L1 bonding requires strict control over delivery order. Since a strict order of all data packets or data segments irrespective of flow identity is preserved, there will of course not be any reordering of data segments. Nevertheless, when many links of different bandwidth are aggregated, and since the status of each link must be known and accounted for, the buffering and reassembly schemes may grow and can become quite complex.

L2/L3 schemes are in comparison less complicated to implement. Basically, a flow is identified by its hash checksum value, often calculated from static address fields. The flow is then assigned to a physical link in an aggregation group. Subsequent data segments with the same hash checksum value are thereafter forwarded to the link originally assigned. This results in that each certain flow only is forwarded by means of one specific corresponding link, which in turn results in that data segment order within flows are preserved. There are several problems associated with this approach, e.g.;

Statistical bias. This could be that the hashing algorithm interferes with address assignment rules in the network thus causing a systematic preference for one link.
Variation width problems when there are few flows. Even without any systematic errors, there is a high possibility of biased outcomes. When assuming 20 flows and "perfect conditions", average possible utilization of the aggregated capacity is as low as 86% with a 25% risk of being as low as 77%.
QoS impact on individual overprovisioned links. I.e. biased link assignment (or temporary congestion on a single link even if distribution otherwise balanced) may lead to unintended data segment drops, i.e. you can drop data segments even when there is capacity available, making the QoS system not really work in a good way.

Consequently, there is a need for improved link aggregation methods.

SUMMARY

It is an object of the present disclosure to provide a communication arrangement and method for improved link aggregation.

This object is obtained by means of a communication arrangement adapted for link aggregation of a plurality of communication links, comprised in an Aggregation Group (AG). The communication arrangement is adapted to communicate via the plurality of communication links and comprises a traffic handling unit that is adapted to obtain data segments to be transmitted, and to determine a risk of re-ordering of data segments within a certain data flow comprising a certain data segment. The risk is associated with transmitting said certain data segment via a certain communication link out of the plurality of communication links, based on link characteristics associated with the communication links. The traffic handling unit is furthermore adapted to buffer said certain data segment until the risk of re-ordering satisfies a predetermined criteria, prior to transmitting the said certain data segment via the selected communication link.

A number of advantages are obtained by means of the present disclosure. Mainly, an enhanced configuration of different devices in a communication link communication system as well as an enhanced interface functionality between these devices is obtained. It is furthermore possible forward to data segments over any link in an aggregation group without reordering within individual flows.

A further advantage is insensitivity to data rate of individual data flows and the capacity offered by individual links without introducing excessive buffering.

A further advantage lies in the possibility to forward data segments over any link in an aggregation group without reordering within individual data flows.

A communication link receiver is agnostic to the present disclosure being applied at a communication link transmitter. Collection and forwarding of data segments can therefore be performed with maintained compatibility.

Since data segments can be forwarded on any communication link for any transmission, a steady state pattern will be reached also for a high utilization of the aggregation group for also a rather limited number of flows.

Since order only must be maintained within flows, necessary buffering is reduced compared to prior art, especially when there are large discrepancies in rate between the communication links in an aggregation group.

According to some aspects, the traffic handling unit is adapted to detect said one or more data flows by determining a hash checksum based on a pre-determined section of each data segment, wherein a flow is identified by a respective hash checksum.

This provides an advantage of uncomplicated identification of the respective data flows.

According to some aspects, the traffic handling unit is adapted to identify a subset of available communication links out of the plurality of communication links, which subset of available communication links is available for transmission of a data segment within a current time period, and to select said certain communication link from the subset of available communication links for transmission of said certain data segment.

According to some aspects, the traffic handling unit is adapted to select said certain communication link by selecting a communication link used for transmission of a most recently transmitted data segment from said certain data flow in case that said communication link is comprised in the subset of available communication links, and selecting any communication link comprised in the subset of available communication links otherwise.

This provides an advantage of avoiding unnecessary buffering.

According to some aspects, the traffic handling unit is adapted to select said certain communication link by maintaining a transmit Flow Identity Table (tFIT) comprising Flow Identities (FI) associated with the identified flows, corresponding communication link identifiers (LID), Delivery Time Stamps (DTS) and Segment Size values (SS). The LIDs are used for identifying said previous communication link used for transmission of the most recently transmitted data segment associated with each FI out of the plurality of communication links, the DTS are time-stamps indicating when in time the last segment was transmitted, and the SS values indicate the data size of the most recently transmitted data segment of the corresponding flow.

This provides an advantage of providing a tool for keeping track of the data flows.

According to some aspects, the DTS value is determined based on a common clock, wherein all communication links are arranged to receive the common clock.

This provides an advantage of providing reliable and consistent DTS values.

According to some aspects, the traffic handling unit is adapted to determine a risk of re-ordering of data segments by maintaining a Link Characterization Table (LCT) comprising status information associated with each communication link in the plurality of communication links.

This provides an advantage of providing a tool for keeping track of communication link status.

According to some aspects, the status information comprises any of Link Latency, LL, Link Capacity, LC, and flow control information indicating if a communication link is available for transmission of a data segment. LC is according to some aspects measured as seconds per bit.

This provides an advantage of providing a tool for keeping track of if there are any available communication links.

According to some aspects, the traffic handling unit is adapted to determine a risk of re-ordering of data segments by determining an Estimated Time of Arrival (ETA) associated with a previously transmitted data segment.

This provides an advantage of reducing the buffering time to what is determined to be necessary.

There are also disclosed herein methods associated with the above-mentioned advantages. Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The present disclosure will now be described more in detail with reference to the appended drawings, where:

FIGS. 10 to 13 are flowcharts illustrating methods implemented in a communication system including a host computer, a base station and a user equipment.

DETAILED DESCRIPTION

Figure 1:
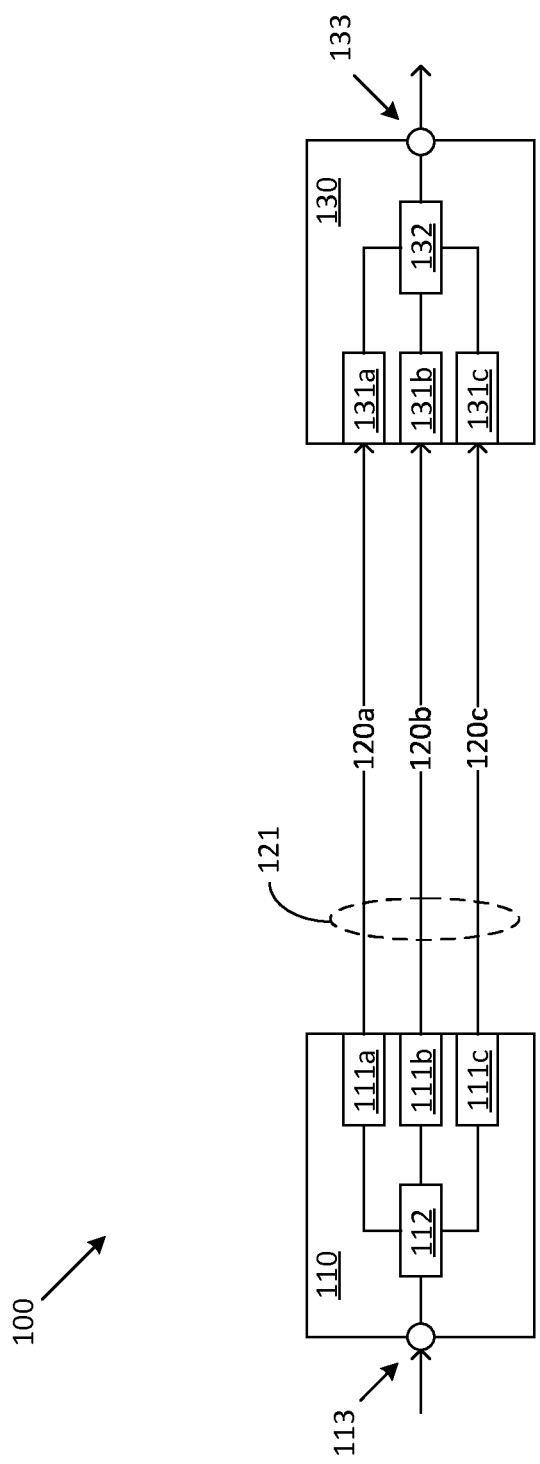
FIG. 1 shows a schematic view of a communication system arranged for link aggregation.

With reference to FIG. 1, a schematic view of a wireless communication arrangement 100 is shown. The wireless communication arrangement 100 comprises a first communication arrangement 110 and a second communication arrangement 130 which are adapted to communicate with each other via a plurality of radio communication links 120a, 120b, 120c. For this purpose, the first communication arrangement 110 comprises a corresponding communication link interface 111a, 111b, 111c for each radio communication link 120a, 120b, 120c, and the second communication arrangement 130 comprises a corresponding communication link interface 131a, 131b, 131c for each radio communication link 120a, 120b, 120c.

Furthermore, the first communication arrangement 110 comprises a first traffic handling unit 112, and the second communication arrangement 130 comprises a second traffic handling unit 132, where each traffic handling unit 112, 132 is adapted to control the communication by routing communication signals that comprise digital data streams.

The radio communication links 120a, 120b, 120c are comprised in an Aggregation Group (AG) 121 and provide an aggregated capacity for forwarding data packets or data segments from one bridge or router port. This means that only one Common QoS domain is handled and that suboptimal dropping cannot occur.

In the following, communication from the first communication arrangement 110 to the second communication arrangement 130 will be described, but according to some aspects, the communication arrangements 110, 130 work reciprocally. Then, also communication directed from the second communication arrangement 130 to the first communication arrangement 110 is enabled.

Figure 4:
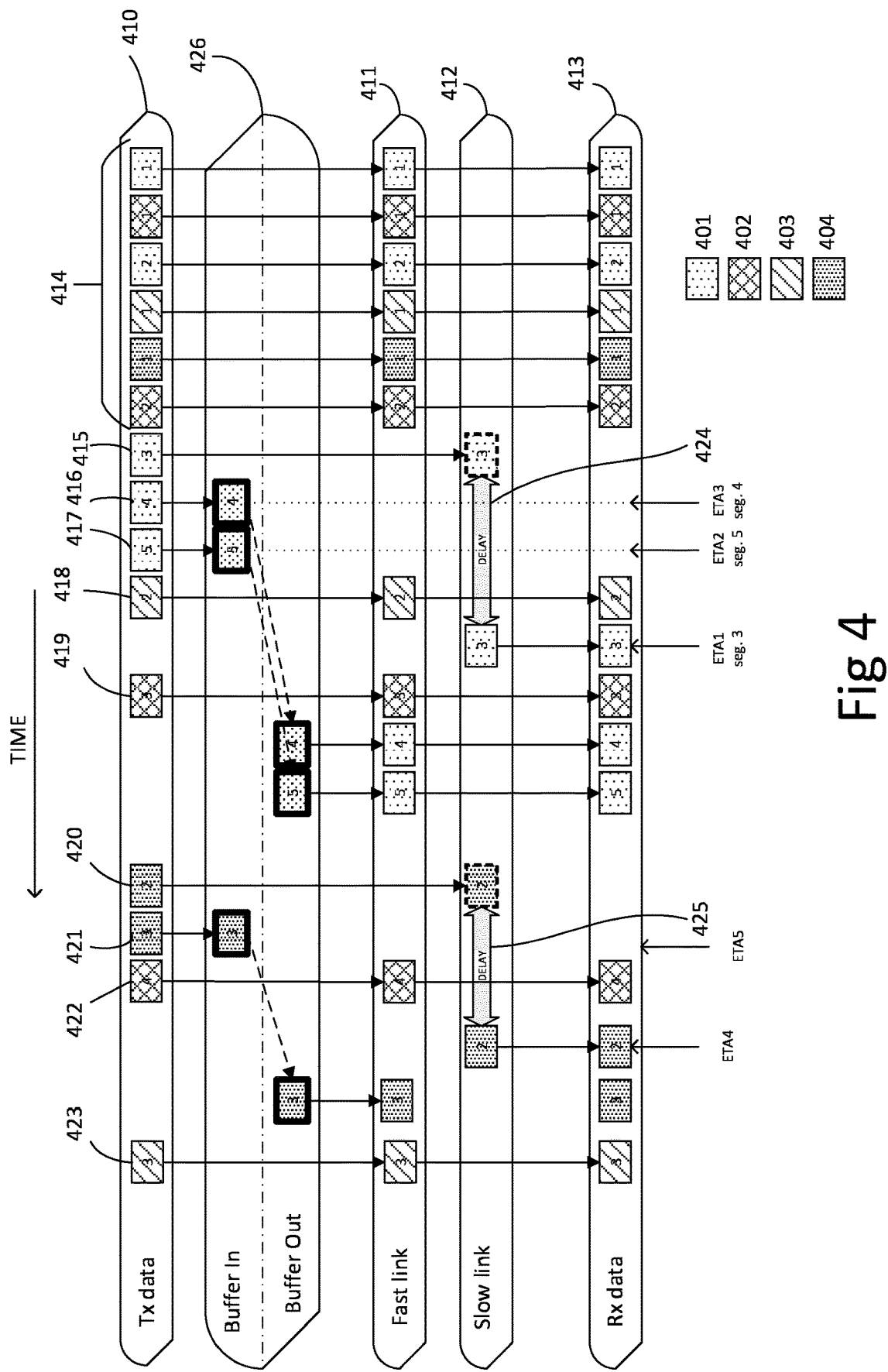
FIG. 4 schematically illustrates transmission and reception of data segments.

With reference also to FIG. 4, the first communication arrangement 110 is adapted to obtain data segments 414-423 to be transmitted. According to the present disclosure, the first traffic handling unit 112 is adapted to determine a risk of reordering of data segments within a certain data flow 401, 404 comprising a certain data segment 416, 417; 421. Said risk is associated with transmitting said certain data segment via a certain communication link out of the plurality of communication links 120a, 120b, 120c, based on link characteristics associated with the communication links 120a, 120b, 120c. Examples of link characteristics and a corresponding Link Characterization Table (LCT) will be discussed more in detail later.

The first traffic handling unit 112 is furthermore adapted to buffer said certain data segment 416, 417; 421 until the risk of re-ordering satisfies a predetermined criteria, prior to transmitting the said certain data segment 416, 417; 421 via the selected communication link.

According to some aspects, the traffic handling unit 112, 132 is adapted to detect and identify one or more data flows 401, 402, 403, 404 in the obtained data segments 414-423, to attach sequence numbers (SEQ) to data segments associated with each identified data flow 401, 402, 403, 404, wherein sequence numbers are independent between data flows, and to calculate a hash checksum for each data segment. Each hash checksum is based on a pre-determined section of each data segment, wherein a flow is identified by a respective hash checksum. The result of this calculation is denominated Flow Identity (FI) and used as entry for a Flow Identity Table (FIT) of arbitrary size; this table is maintained as a transmitting side table (tFIT) as well as a receiving side table (rFIT). The table is then used for identifying the different data flows 401, 402, 403, 404 and is constructed from parsing the data flows, no control plane communication over the link is needed to synchronize the tables.

The table contains information for each Flow Identity on what link, Link ID (LID) the last data segment was forwarded and the data flow specific sequence number SEQ and also a last sequence number (SQN) for the latest data segment of a certain data flow that has been forwarded over each radio communication link 120a, 120b, 120c in the AG 121. The rFIT further comprises Delivery Time Stamps, DTS, and Segment Size, SS, values, where the DTS are time-stamps indicating when in time the last segment was transmitted, and the SS values indicate the data size of the most recently transmitted data segment of the corresponding flow.

The traffic handling unit 112, 132 is adapted to select said certain communication link by maintaining the tFIT.

In this context, a flow or data flow is a coherent and consecutive flow of data segments. A data flow can according to some aspects correspond to a user streaming a film, a user sending an e-mail or a user having a telephone conversation.

According to some aspects, the traffic handling unit 112, 132 is adapted to identify a subset of available communication links out of the plurality of communication links 120a, 120b, 120c, which subset of available communication links is available for transmission of a data segment within a current time period, and to select said certain communication link from the subset of available communication links for transmission of said certain data segment 416, 417; 421.

According to some aspects, the traffic handling unit 112, 132 is adapted to select said certain communication link by selecting a communication link used for transmission of a most recently transmitted data segment from said certain data flow 401, 404 in case that said communication link is comprised in the subset of available communication links, and selecting any communication link comprised in the subset of available communication links otherwise.

A communication link receiver, here the in the form of the second communication arrangement 130, is agnostic of the method applied at the communication link transmitter, here in the form of the first communication arrangement 110. Collection and forwarding of data segments can therefore be performed with maintained compatibility.

In other words, the second communication arrangement 130, thus acting as a communication link receiver, is adapted to receive data segments 414-423 via the plurality of communication links 120a, 120b, 120c, and to forward these data segments 414-423 according to receive order on an output port 133. For this purpose, the first communication arrangement 110 and the second communication arrangement 130 are according to some aspects arranged with a common clock functionality. The common clock functionality is used for determining the DTS.

Figure 3:
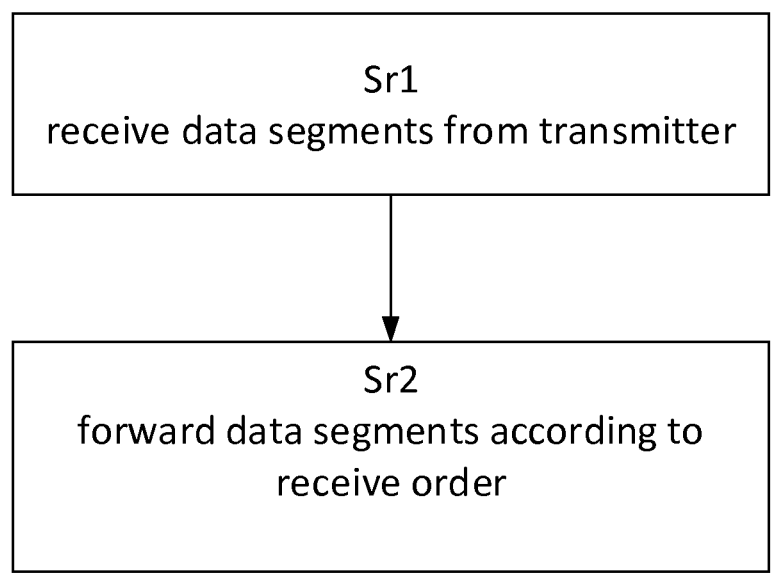
FIG. 3 shows a flowchart illustrating methods according to examples of the present disclosure.

With reference to FIG. 3, showing a flowchart for a procedure that according to some aspects is performed at the second traffic handling unit 132 that here functions as a communication link receiver, there is a method for link aggregation of a plurality of communication links. The second traffic handling unit 132 is arranged with a clock common to a corresponding communication link transmitter. The method comprises receiving Sr1 data segments via the plurality of communication links, and forwarding Sr2 data segments according to receive order on an output port of the communication link receiver.

According to some aspects, the traffic handling unit 112, 132 is adapted to determine a risk of re-ordering of data segments by maintaining a Link Characterization Table (LCT) comprising status information associated with each communication link in the plurality of communication links 120a, 120b, 120c. For example, the status information comprises any of Link Latency (LL), Link Capacity (LC) and flow control information indicating if a communication link is available for transmission of a data segment or not. In other words, the link characteristics comprises any of; link latency, link bandwidth, and link throughput. The link characteristics are configured to be either static or dynamic. In the latter case, the traffic handling unit 112 is adapted to determine a risk of re-ordering of data segments by updating link characteristics associated with the selected communication link.

Data segments are transmitted whenever there is a free communication link in the Aggregation Group 121. If the communication link that the previous data segment with the same FI was transmitted over is free, that one shall be preferred. More in detail, when a data segment is received, the FI is calculated and the FIT is checked for over what communication link the previous data segment with the same FI was transmitted. If that communication link is free according to the flow control information, the current data segment is simply forwarded over the same communication link and the FIT entry is updated with DTS and segment size, or packet size, (PS) for the new data segment.

If the communication link is occupied according to the control information, an Estimated Time of Arrival (ETA) is calculated for the previous data segment from existing data in the FIT and LCT. The first traffic handling unit 112 is thus adapted to determine a risk of re-ordering of data segments by determining the ETA associated with a previously transmitted data segment. This will be described more in detail in the following.

The subscript p means that a previous data segment is referred to, the subscript n refers to the specific communication link used for transferring a certain data segment, and the subscript c means that a current data segment is referred to. The Estimated Time of Arrival for a certain previous data segment can be written as:

$$ETA_p = DTS_p + LL_p + PS_p * LC_n$$

After that, a free communication link is selected for the current data segment and $ETA_c$ for the current data segment is calculated.

If $ETA_c > ETA_p$, the data segment is immediately forwarded on the new communication link. If not, i.e. the current data segment would arrive before the previous one if immediately forwarded, a Buffering Time (BT) is calculated according to $$BT = ETA_p - ETA_c.$$

The FIT entry is then updated with an Estimated DTS (eDTS) and PS for the new data segment according to $$eDTS = CTS + BT + M,$$

where CTS is a Current Time Stamp and M is a margin added to compensate for a possible serialization delay postponing delivery after the Buffering Time BT. A Buffering Timer keeps track of the Target DTS (tDTS) according to $$tDTS = CTS + BT.$$

When the clock reaches tDTS, the data segment is forwarded as soon as the communication link is free, i.e. when the flow control information is indicating that the communication link is available for transmission of a data segment, and the Actual DTS (aDTS) is recorded. A correction factor C is calculated according to $$C = tDTS + M - aDTS.$$

C is then subtracted from all Buffering Timers active for the corresponding FI and from the DTS in the FIT provided it is an eDTS, i.e. located in the future.

Based on having a knowledge of the time it takes to deliver a data segment, a minimal buffering time to avoid reordering is expected, and a data segment must be sent at the earliest after that time, the tDTS. Because of the risk that another flow will occupy the present link at the tDTS, eDTS, which is actually the last time the package can be sent (given prior delivery). aDTS is the actual time the package is sent, the time is used to update tDTS and eDTS for packages in the same flow that are still being buffered. That is, when we buffer multiple packages in the same flow, we need to start from eDTS when calculating ETA for previous packages that have not yet been sent. Once the previous package has been sent and you know aDTS, delivery time for subsequent packages can be updated.

A basic functionality of the present disclosure will now be described more in detail with reference to FIG. 1 and FIG. 4. Here there is a first data flow 401 that is shown with sparse dots, a second data flow 402 that is shown with a chequered pattern, a third data flow 403 is shown with left to right ascending stripes and a fourth data flow 404 is shown with dense dots. In a Tx data layer 410, the different data flows with data segments have been identified and flow-specific sequence numbers SEQ have been attached to each data segment, denoting the order of the data segments for each data flow. Here, there are two radio communication links available, a first link 411 that is relatively fast and a second link 412 that is relatively slow.

The first six data segments 414 are decided to be transferred via the first link 411, and the first traffic handling unit 112 is adapted to determine corresponding estimated times of arrival for these data segments 414. Since the order of these data segments 414 is determined to be the same according to the corresponding estimated times of arrival, the data segments of the different data flows 401, 402, 403, 404 comprised in these data segments 414 are determined to be received at the second communication arrangement 130 in correct order. The first traffic handling unit 112 then enables these data segments 414 to be transmitted via the first link 411, and they are received at the second communication arrangement 130 and there forwarded to an Rx data layer 413.

The following seventh data segment 415, being comprised in the first data flow 401 and having a SEQ of 3, is decided to be transferred via the second link 412. There is a first excess delay 424 before the seventh data segment 415 is forwarded, and the first traffic handling unit 112 is adapted to determine a first estimated time of arrival ETA1 for the seventh data segment 415 by estimating the first excess delay 424. The first traffic handling unit 112 then enables this data segment 415 to be transmitted via the second link 412.

The following two data segments 416, 417, an eighth data segment 416 and a ninth data segment 417, being comprised in the first data flow 401 and having a corresponding SEQ of 4 and 5, are decided to be transferred via the first link 411.

The first traffic handling unit 112 is adapted to determine a corresponding estimated second time of arrival ETA2 and third time of arrival ETA3 for these data segments 416, 417, and to compare these estimated ETA:s with the first estimated time of arrival ETA1. In this case, ETA1>ETA3>ETA2, indicating that the seventh data segment 415 will be received at the at the second communication arrangement 130 after the eighth data segment 416 and the ninth data segment 417, while the eighth data segment 416 and the ninth data segment 417 are determined to be received at the second communication arrangement 130 in correct order. This indicates that the order of these received data segments 415, 416, 417 of the first data flow 401 will be incorrect, the seventh data segment 415 being received at the second communication arrangement 130 after the eighth data segment 416 and the ninth data segment 417.

The first traffic handling unit 112 is therefore adapted to buffer the eighth data segment 416 and the ninth data segment 417 such that the order of these data segments is determined to be correct when received at the second communication arrangement 130.

After the first excess delay 424, the seventh data segment 415 is received at the second communication arrangement 130 and forwarded to the Rx data layer 413.

Before the eighth data segment 416 and the ninth data segment 417 are transferred via the first link 411, a tenth data segment 419 being comprised in the second data flow 402 is decided to be transferred via the first link 411, and the first traffic handling unit 112 is adapted to determine an estimated time of arrival for this data segment 419. Since no other previous data segments comprised in the second data flow 402 are determined to be received at the second communication arrangement 130 after the tenth data segment 419, the first traffic handling unit 112 enables this data segment 419 to be transmitted via the first link 411, and it is received at the second communication arrangement 130 and forwarded to the Rx data layer 413.

Thereafter, the eighth data segment 416 and the ninth data segment 417 are transferred via the first link 411, received at the second communication arrangement 130 and forwarded to the Rx data layer 413. Since the tenth data segment 419 is comprised in the second data flow 402, it does not matter that this data segment was received at the second communication arrangement 130 before the eighth data segment 416 and the ninth data segment 417, since the order with the data flows is preserved.

Here it is to be noted that the margin M mentioned previously, that is used for postponing delivery after the Buffering Time BT, here is used to compensate for a possibility of a data segment like the tenth data segment 419 that is transferred before the eighth data segment 416 and the ninth data segment 417. Should there not have been a tenth data segment 419 in this example, an earlier Actual DTS (aDTS) would have been recorded for the eighth data segment 416, and a corresponding correction factor C would have been calculated and used for the ninth data segment 417.

A corresponding procedure is repeated for a following eleventh data segment 420 and twelfth data segment 421 which both are comprised in the fourth data flow 404, where the eleventh data segment 420 is decided to be transferred via the second link 412 and the twelfth data segment 421 is decided to be transferred via the first link 411. There is a second excess delay 425 before the eleventh data segment 420 is forwarded, and the first traffic handling unit 112 is adapted to determine a fourth estimated time of arrival ETA4 for the eleventh data segment 420 by estimating the second excess delay 425.

The first traffic handling unit 112 is adapted to determine an estimated fifth time of arrival ETA5 for the twelfth data segment 421, and to compare is estimated ETA5 with the fourth estimated time of arrival ETA4. In this case, ETA4>ETA5, indicating that the eleventh data segment 420 will be received at the at the second communication arrangement 130 after the twelfth data segment 421. This indicates that the order of these received data segments 420, 421 the first fourth data flow 404 will be incorrect, the eleventh data segment 420 being received at the second communication arrangement 130 after the twelfth data segment 421.

The first traffic handling unit 112 is therefore adapted to buffer the twelfth data segment 421 such that the order of these data segments 420, 421 is determined to be correct when received at the second communication arrangement 130.

Before the eleventh data segment 420 and the twelfth data segment 421 are transferred, a thirteenth data segment 422 being comprised in the second data flow 402 is decided to be transferred via the first link 411, and the first traffic handling unit 112 is adapted to determine an estimated time of arrival for this data segment 422. Since no other previous data segments comprised in the second data flow 402 are determined to be received at the second communication arrangement 130 after the thirteenth data segment 422, the first traffic handling unit 112 enables this data segment 422 to be transmitted via the first link 411, and where it is received at the second communication arrangement 130 and forwarded to the Rx data layer 413.

Thereafter, the second excess delay 425 has timed out and the eleventh data segment 420 is received at the second communication arrangement 130 and forwarded to the Rx data layer 413. Then the twelfth data segment 421 is transferred via the first link 411, received at the second communication arrangement 130 and forwarded to the Rx data layer 413.

In FIG. 4, there is a following fourteenth data segment 423 comprised in the third data flow 403 that has been decided to be transferred via the first link 411. The first traffic handling unit 112 enables this data segment 423 to be transmitted via the first link 411, and it is received at the second communication arrangement 130 and there forwarded to the Rx data layer 413. According to some aspects, the sequence numbers are detached from the data segments before transmission and consequently never transmitted. In FIG. 4, the sequence numbers are shown at the links 411, 412 and the Rx data layer 413 for reasons of clarity.

According to some aspects, the buffering is performed in a buffering functionality or buffering layer 426 that is comprised in the first communication arrangement 110.

Figure 5:
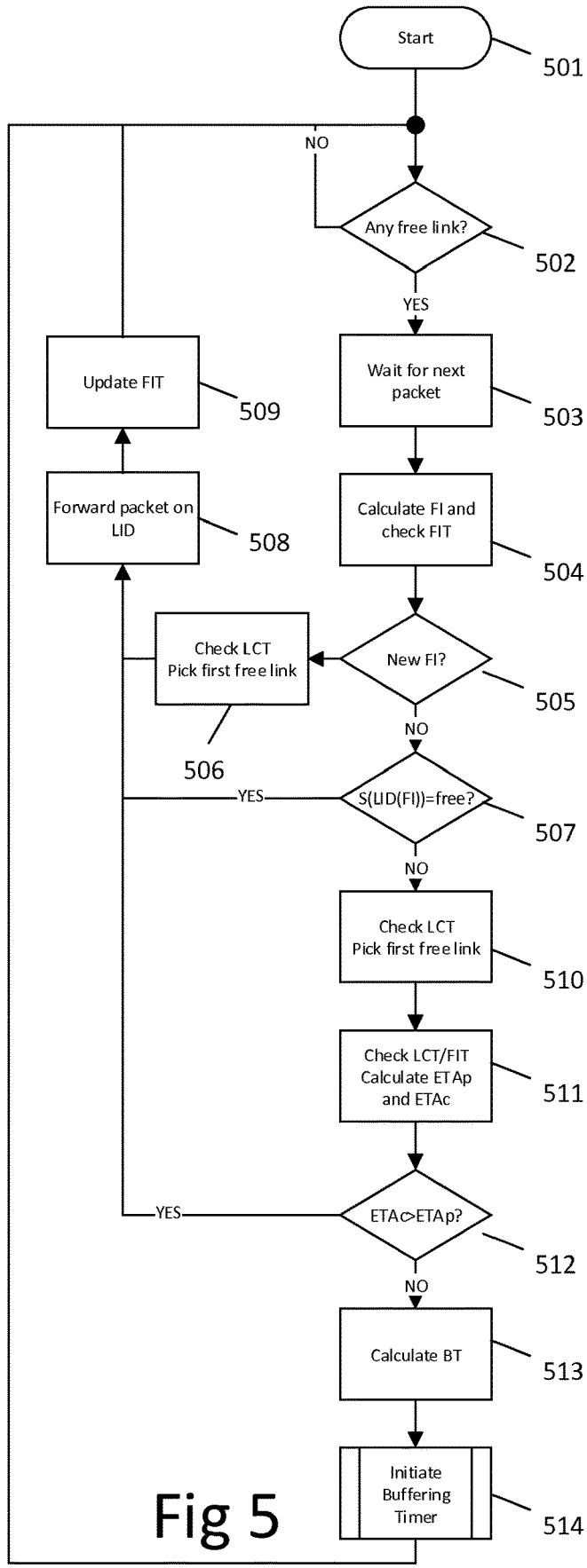
FIG. 5 shows a flowchart illustrating methods according to examples of the present disclosure.

FIG. 5 shows a flow chart of a process according to some aspects at the first communication arrangement 110. After start 501, it is investigated 502 if there are any free links available until there are. Then, a next data segment, or data packet, is awaited 503. For that data segment FI is calculated and tFIT is checked 504. It is investigated 505 if it is a new FI, and if that is the case LCT is checked and a first free link is picked 506. If not, it is investigated if the link via which the last data segment of the flow in question was forwarded is free 507, and that is the case, and also after a first free link is picked 506, the data segment is forwarded on LID 508, FIT is updated 509 and it is again investigated 502 if there are any free links available until there are.

If the link via which the last data segment of the flow in question was forwarded is not free at the investigation step 507, LCT is checked and a first free link is picked 510. Then LCT/FIT is checked and estimated time of arrival for a previous data segment $ETA_p$ and a current data segment $ETA_c$ are calculated 511. Then it is investigated 512 if $ETA_c > ETC_p$, and if that is the case the package is forwarded on the LID 508. Otherwise, a buffering time BT is calculated 513 and a buffering timer is initiated 514.

Figure 7:
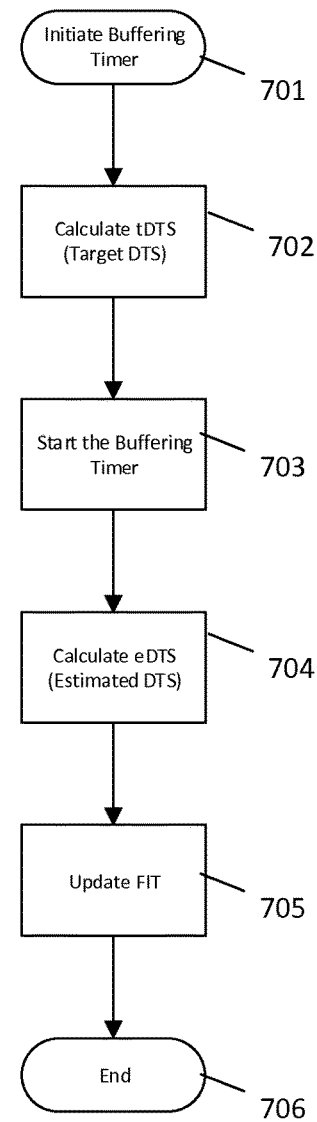
FIG. 7 shows a flowchart illustrating methods according to examples of the present disclosure.

An example of step 514 is described with reference to FIG. 7. Here, the buffering timer is initiated 701, a target delivery time stamp DTS is calculated 702, a buffering timer is started 703, estimated DTS is calculated 704, FIT is updated 705, and the procedure then ends 706.

Figure 6A:
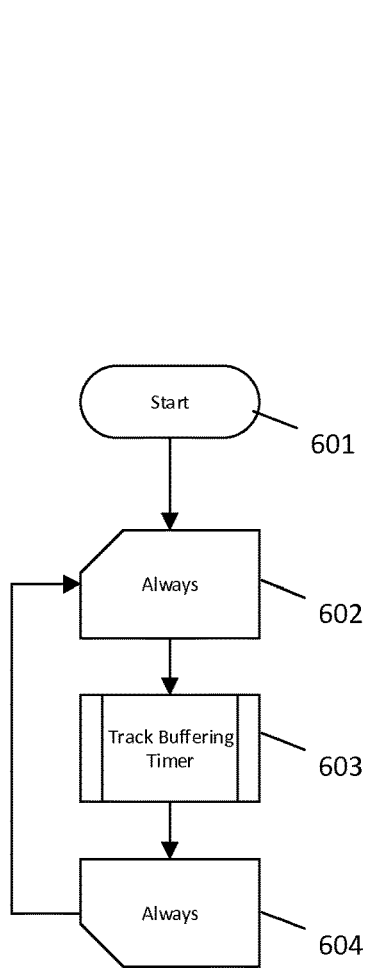
FIGS. 6a-6b shows flowcharts illustrating methods according to examples of the present disclosure.

FIG. 6a shows a flow chart of a process according to some aspects at the first communication arrangement 110; here the process is started 601, always 602 the buffering timer is tracked 603, and the process always restarts 604.

Figure 6B:
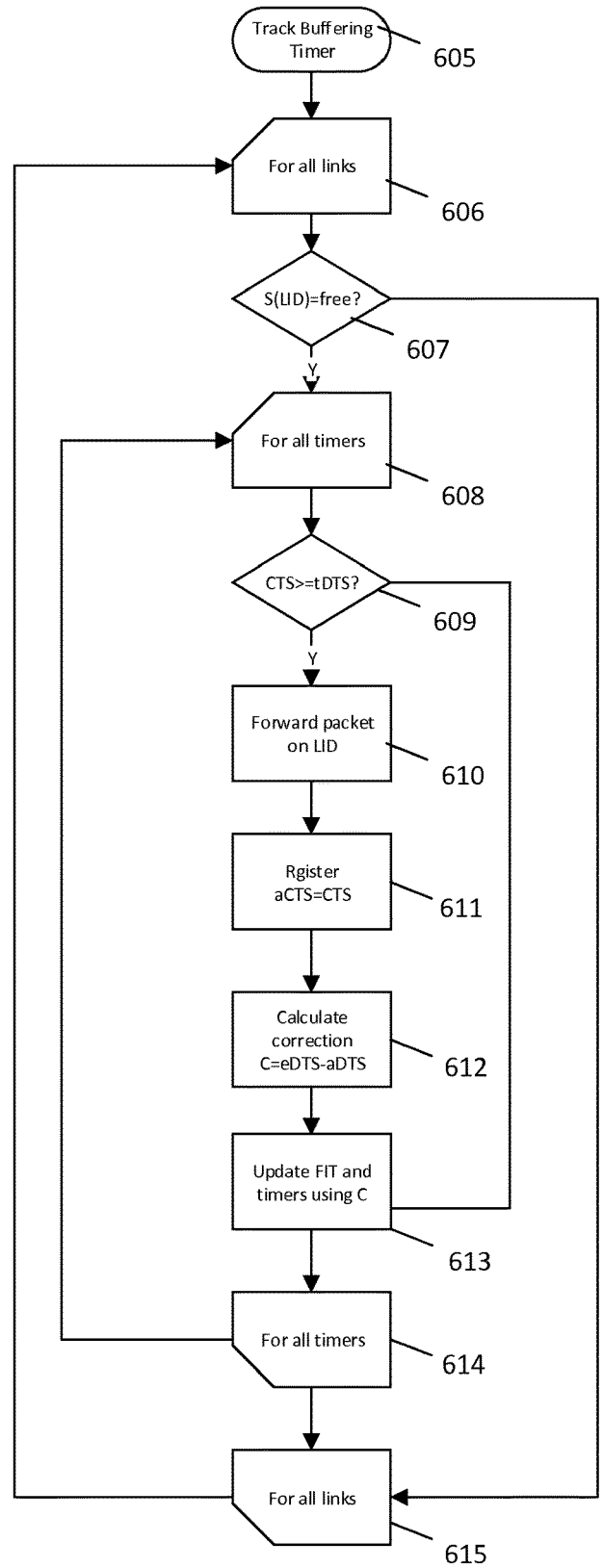

FIG. 6b shows a flow chart of a process according to some aspects at the first communication arrangement 110, more specifically tracking of buffering timer 603. Packets with postponed delivery time reside in a buffer until delivery. With each packet is a timer and a targeted delivery time (tDTS) associated.

The status of every link in the aggregation group is checked 606, 607. For all buffering timers (BT) 608 associated with the link, provided it's free, it is checked whether current time (CTS) has passed the targeted delivery time (tDTS) 609. If so, the packet associated with that BT is forwarded in the link 610. The actual delivery time (aDTS) is then recorded 611 for the delivered packet and the correction factor (C) is calculated 612. C is then used to correct BT:s that still are active for the same FI and update 613 the Flow Identity Table to reflect the correct delivery time for the packet. This is repeated for all timers 614. Should the link not be free, a loop of checking if the link is free is repeated for all timers 615 until the link is free.

Enabling buffering of data segments at the transmitting side is an enhanced way of using the communication links, enabling a more effective hashing and also enabling moving data flows between the communication links by keeping track of an ETA and compensating for the ETA when a data flow is moved to a faster communication link.

Since data segments can be forwarded on any radio communication link for any transmission, a steady state pattern will be reached also when the utilization of the aggregation group is high. This is also the case with only one data flow. Also, since every data flow prefer to stay on the same radio communication link, data flows will be "attracted" to radio communication links that can sustain the data flow's full capacity need.

Since order only must be maintained within data flows, necessary buffering is less than for Communication link Bonding, especially when there are large discrepancies in rate between the communication links in an aggregation group. This is accomplished by attaching separate sequence number per data flow.

The present disclosure is not limited to the examples above, but may vary freely within the scope of the appended claims.

For example, one or more of the radio communication links 120*a*, 120*b*, 120*c* need not be wireless radio links, by may be wired communication links. Generally, they are constituted by communication links 120*a*, 120*b*, 120*c*, and the communication link interfaces 111*a*, 111*b*, 111*c*; 131*a*, 131*b*, 131*c* are adapted for the present kind of communication link. For example, for a radio communication link, the communication link interface comprises a microwave radio and link antenna.

An estimated time of arrival (ETA) has been determined in order to estimate an order of received data segments. Generally, the traffic handling unit 112, 132 is adapted to determine a risk of re-ordering of data segments within a certain data flow. Such risk can for example be derived from an ETA.

The Flow Identity (FI), the Flow Identity Table (FIT) and its components are optional.

Figure 2:
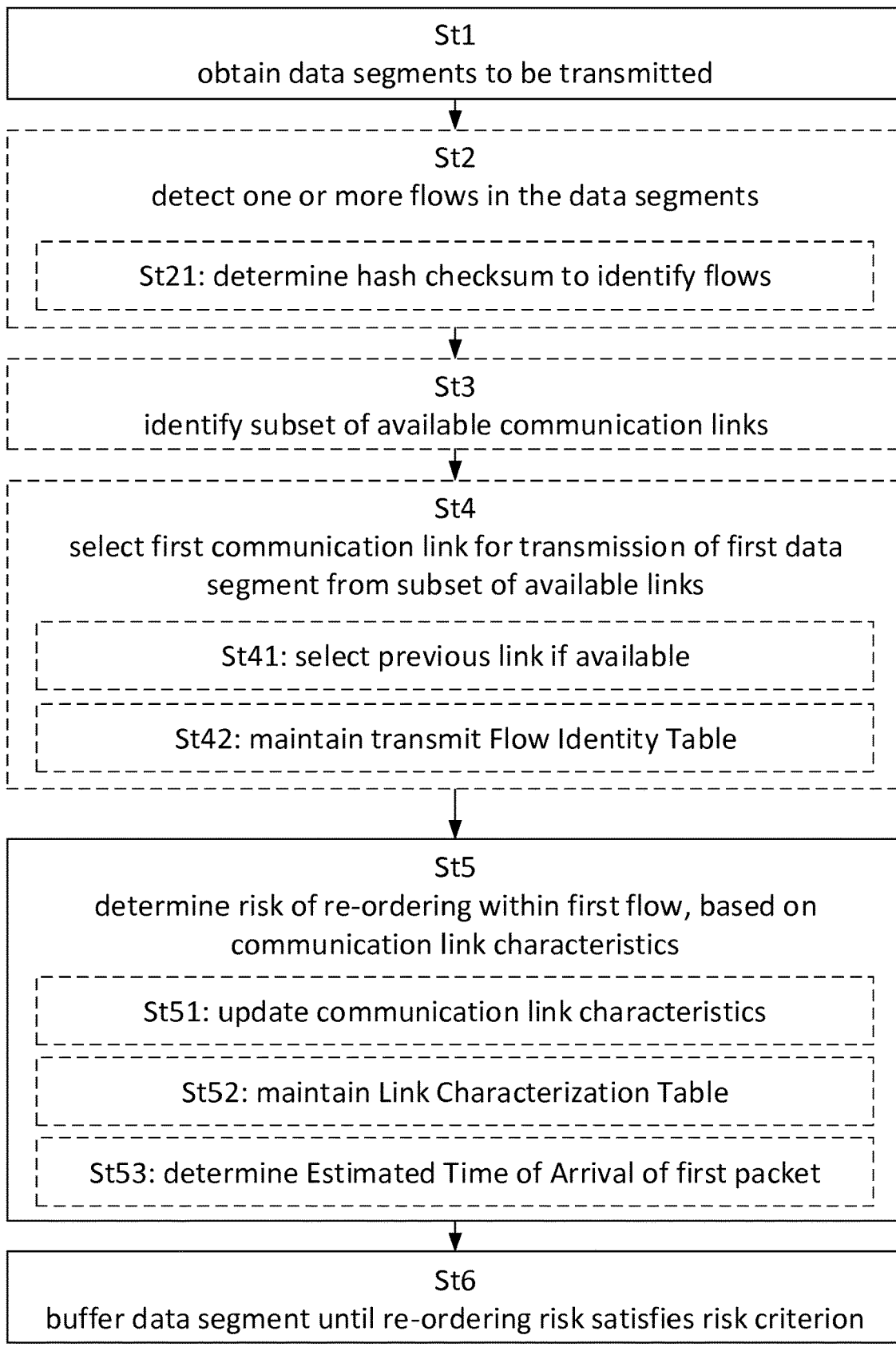
FIG. 2 shows a flowchart illustrating methods according to examples of the present disclosure.

With reference to FIG. 2, the present disclosure relates to method for link aggregation of a plurality of communication links 120*a*, 120*b*, 120*c* comprised in an Aggregation Group, AG, performed in a communication arrangement 110, 130, comprising;

obtaining St1 data segments 414-423 to be transmitted, determining St5 a risk of re-ordering of data segments within a certain data flow 401, 404 comprising a certain data segment 416, 417; 421, where said risk is associated with transmitting said certain data segment via a certain communication link out of the plurality of communication links 120*a*, 120*b*, 120*c*, based on link characteristics associated with the communication links 120*a*, 120*b*, 120*c*, and buffering St6 said certain data segment 416, 417; 421 until the risk of re-ordering satisfies a predetermined criteria, prior to transmitting the said certain data segment 416, 417; 421 via the selected communication link.

According to some aspects, the method comprises detecting St2 one or more data flows 401, 402, 403, 404 in the obtained data segments 414-423.

According to some aspects, the detecting St2 comprises determining St21 a hash checksum based on a pre-determined section of each data segment, wherein a flow is identified by a respective hash checksum.

According to some aspects, the method comprises identifying St3 a subset of available communication links out of the plurality of communication links 120*a*, 120*b*, 120*c*, which subset of available communication links is available for transmission of a data segment within a current time period, and selecting St4 said certain communication link from the subset of available communication links for transmission of said certain data segment 416, 417; 421.

According to some aspects, the selecting St4 comprises selecting St41 a communication link used for transmission of a most recently transmitted data segment from said certain data flow 401, 404 in case that said communication link is comprised in the subset of available communication links, and selecting any communication link comprised in the subset of available communication links otherwise.

According to some aspects, the selecting St4 comprises maintaining St42 a transmit Flow Identity Table, tFIT, comprising Flow Identities, FI, associated with the identified flows 401, 402, 403, 404, corresponding communication link identifiers, LID, Delivery Time Stamps, DTS, and Segment Size values, SS, wherein the LIDs are used for identifying said previous communication link used for transmission of the most recently transmitted data segment associated with each FI out of the plurality of communication links 120*a*, 120*b*, 120*c*, the DTS are time-stamps indicating when in time the last segment was transmitted, and the SS values indicate the data size of the most recently transmitted data segment of the corresponding flow.

According to some aspects, the DTS value is determined based on a common clock, wherein all communication links are arranged to receive the common clock.

According to some aspects, the link characteristics comprises any of; link latency, link bandwidth, and link throughput.

According to some aspects, the link characteristics are configured to be static.

According to some aspects, the link characteristics are dynamic, and wherein the determining St5 comprises updating St51 link characteristics associated with the selected communication link.

According to some aspects, the determining St5 comprises maintaining St52 a Link Characterization Table, LCT, comprising status information associated with each communication link in the plurality of communication links 120*a*, 120*b*, 120*c*.

According to some aspects, the status information comprises any of Link Latency, LL, Link Capacity, LC, and flow control information indicating if a communication link is available for transmission of a data segment.

According to some aspects, the determining St5 comprises determining St53 an Estimated Time of Arrival, ETA, associated with a previously transmitted data segment.

According to some aspects, the plurality of communication links 120*a*, 12*b*, 120*c* comprises one or more radio communication links 120*a*, 120*b*, 120*c*, and wherein the communication arrangement 110, 130 comprises a traffic handling unit 112, 132 and a communication link interface 111*a*, 111*b*, 111*c*; 131*a*, 131*b*, 131*c* for each communication link 120*a*, 120*b*, 120*c*.

Generally, the present disclosure relates to a communication arrangement 110, 130 adapted for link aggregation of a plurality of communication links 120*a*, 12*b*, 120*c*, comprised in an Aggregation Group, AG, 121, which communication arrangement 110, 130 is adapted to communicate via the plurality of communication links 120*a*, 120*b*, 120*c* and comprises a traffic handling unit 112, 132, which traffic handling unit 112, 132 is adapted to: obtain data segments 414-423 to be transmitted, determine a risk of re-ordering of data segments within a certain data flow 401, 404 comprising a certain data segment 416, 417; 421, where said risk is associated with transmitting said certain data segment via a certain communication link out of the plurality of communication links 120*a*, 120*b*, 120*c*, based on link characteristics associated with the communication links 120*a*, 120*b*, 120*c*, and to buffer said certain data segment 416, 417; 421 until the risk of re-ordering satisfies a predetermined criteria, prior to transmitting the said certain data segment 416, 417; 421 via the selected communication link.

According to some aspects, the traffic handling unit 112, 132 is adapted to detect one or more data flows 401, 402, 403, 404 in the obtained data segments 414-423.

According to some aspects, the traffic handling unit 112, 132 is adapted to detect said one or more data flows 401, 402, 403, 404 by determining a hash checksum based on a pre-determined section of each data segment, wherein a flow is identified by a respective hash checksum.

According to some aspects, the traffic handling unit 112, 132 is adapted to identify a subset of available communication links out of the plurality of communication links 120a, 120b, 120c, which subset of available communication links is available for transmission of a data segment within a current time period, and to select said certain communication link from the subset of available communication links for transmission of said certain data segment 416, 417; 421.

According to some aspects, the traffic handling unit 112, 132 is adapted to select said certain communication link by selecting a communication link used for transmission of a most recently transmitted data segment from said certain data flow 401, 404 in case that said communication link is comprised in the subset of available communication links, and selecting any communication link comprised in the subset of available communication links otherwise.

According to some aspects, the traffic handling unit 112, 132 is adapted to select said certain communication link by maintaining a transmit Flow Identity Table, tFIT, comprising Flow Identities, FI, associated with the identified flows 401, 402, 403, 404, corresponding communication link identifiers, LID, Delivery Time Stamps, DTS, and Segment Size values, SS, wherein the LIDs are used for identifying said previous communication link used for transmission of the most recently transmitted data segment associated with each FI out of the plurality of communication links 120a, 120b, 120c, the DTS are time-stamps indicating when in time the last segment was transmitted, and the SS values indicate the data size of the most recently transmitted data segment of the corresponding flow.

According to some aspects, the DTS value is determined based on a common clock, wherein all communication links are arranged to receive the common clock.

According to some aspects, the link characteristics comprises any of; link latency, link bandwidth, and link throughput.

According to some aspects, the link characteristics are configured to be static.

According to some aspects, the link characteristics are dynamic, and wherein the traffic handling unit 112, 132 is adapted to determine a risk of re-ordering of data segments by updating link characteristics associated with the selected communication link.

According to some aspects, the traffic handling unit 112, 132 is adapted to determine a risk of re-ordering of data segments by maintaining a Link Characterization Table, LCT, comprising status information associated with each communication link in the plurality of communication links 120a, 120b, 120c.

According to some aspects, the status information comprises any of Link Latency, LL, Link Capacity, LC, and flow control information indicating if a communication link is available for transmission of a data segment.

According to some aspects, the traffic handling unit 112, 132 is adapted to determine a risk of re-ordering of data segments by determining an Estimated Time of Arrival, ETA, associated with a previously transmitted data segment.

According to some aspects, the plurality of communication links 120a, 12b, 120c comprises one or more radio communication links 120a, 120b, 120c, and wherein the communication arrangement 110, 130 comprises a communication link interface 111a, 111b, 111c; 131a, 131b, 131c for each communication link 120a, 120b, 120c.

Figure 8:
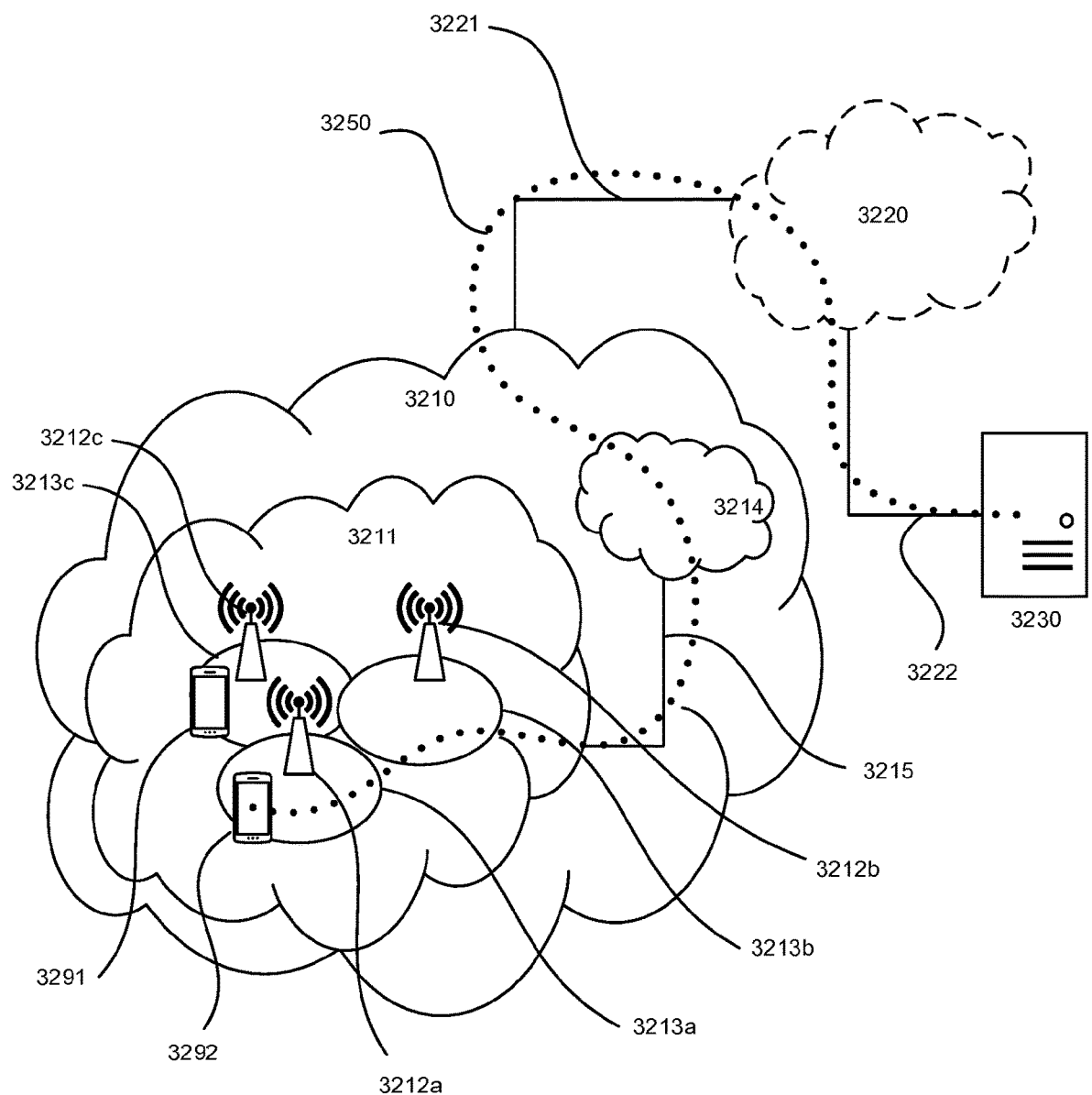
FIG. 8 schematically illustrates a telecommunication network connected via an intermediate network to a host computer.

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 321c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

Figure 9:
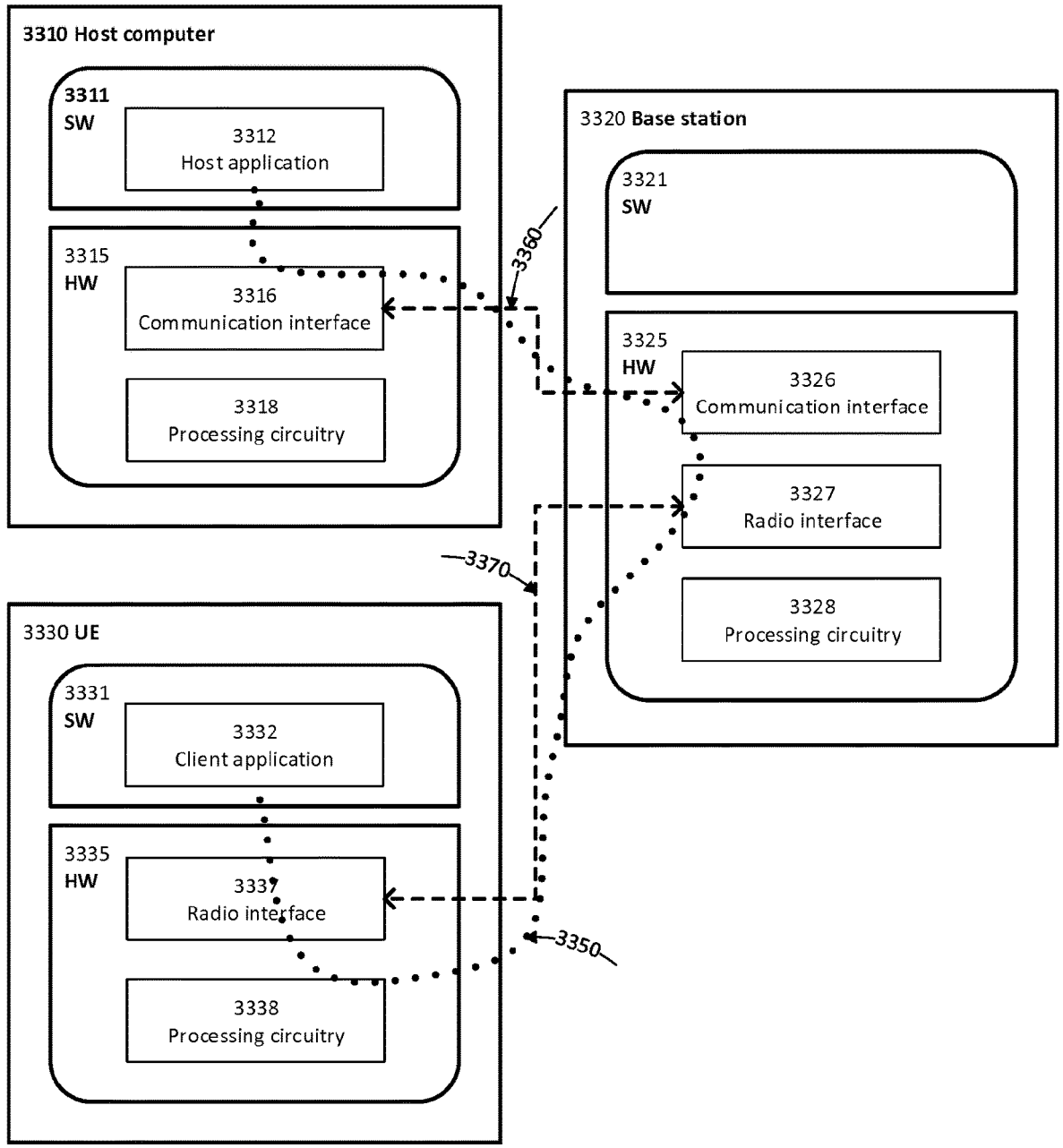
FIG. 9 is a generalized block diagram of a host computer communicating via a base station with a user equipment over a partially wireless connection.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. [If the radio-related invention has not yet been formulated at the time of drafting a provisional application, the expression "embodiments described throughout this disclosure" is meant to refer to the radio-related embodiments disclosed elsewhere in the application.] One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

[FIGS. 10 and 11 and the corresponding text are about a downstream aspect of the radio-related invention, while FIGS. 12 and 13 and the corresponding text discuss an upstream aspect. If only one aspect is applicable for an invention, then, because the text and drawings are self-contained for each aspect, the text and drawings for the other aspect may be omitted without disadvantage.]

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Numbered Embodiments

[Embodiments 1, 11, 21 and 31 represent a downstream aspect of the radio-related invention, and embodiments 41, 51, 61 and 71 represent an upstream aspect of the radio-related invention. If the application must be finalized before the invention (or most important embodiments) have been formulated in claim language, then exceptionally the drafter may omit this section and rely on the expression "embodiments described throughout this disclosure" in the Detailed description.]

1. A base station configured to communicate with a user equipment (UE), the base station comprising a radio interface and processing circuitry configured to [functionalities in base station for preparing/initiating/maintaining/supporting/ending a transmission to the UE].

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to [functionalities in base station for preparing/initiating/maintaining/supporting/ending a transmission to the UE].

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising [steps in base station for preparing/initiating/maintaining/supporting/ending a transmission to a UE].

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station [steps in base station for preparing/initiating/maintaining/supporting/ending a transmission to the UE].

16. The method of embodiment 15, further comprising:
at the base station, transmitting the user data.

17. The method of embodiment 16, wherein the user data is provided at the host computer by executing a host application, the method further comprising:
at the UE, executing a client application associated with the host application.

21. A user equipment (UE) configured to communicate with a base station, the UE comprising a radio interface and processing circuitry configured to [functionalities in UE for preparing/initiating/maintaining/supporting/ending receipt of the transmission from the base station].

25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to [functionalities in UE for preparing/initiating/maintaining/supporting/ending a transmission from a base station].

26. The communication system of embodiment 25, further including the UE.

27. The communication system of embodiment 26, wherein the cellular network further includes a base station configured to communicate with the UE.

28. The communication system of embodiment 26 or 27, wherein:
the processing circuitry of the host computer is configured to execute a host application, thereby providing the user data; and
the UE's processing circuitry is configured to execute a client application associated with the host application.

31. A method implemented in a user equipment (UE), comprising [steps in UE for preparing/initiating/maintaining/supporting/ending receipt of the transmission from a base station].

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE [steps in UE for preparing/initiating/maintaining/supporting/ending receipt of the transmission from the base station].

36. The method of embodiment 35, further comprising:
at the UE, receiving the user data from the base station.

41. A user equipment (UE) configured to communicate with a base station, the UE comprising a radio interface and processing circuitry configured to [functionalities in UE for preparing/initiating/maintaining/supporting/ending a transmission to the base station].

45. A communication system including a host computer comprising:
a communication interface configured to receive user data originating from a transmission from a user equipment (UE) to a base station,
wherein the UE comprises a radio interface and processing circuitry, the UE's processing circuitry configured to: [functionalities in UE for preparing/initiating/maintaining/supporting/ending the transmission to the base station].

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising [steps in UE for preparing/initiating/maintaining/supporting/ending a transmission to a base station].

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE [steps in UE for preparing/initiating/maintaining/supporting/ending a transmission to a base station].

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to [functionalities in base station for preparing/initiating/maintaining/supporting/ending receipt of the transmission from the UE].

65. A communication system including a host computer comprising a communication interface configured to receive user data originating from a transmission from a user equipment (UE) to a base station, wherein the base station comprises a radio interface and processing circuitry, the base station's processing circuitry configured to [functionalities in base station for preparing/initiating/maintaining/supporting/ending the transmission from the UE].

66. The communication system of embodiment 65, further including the base station.
67. The communication system of embodiment 66, further including the UE, wherein the UE is configured to communicate with the base station.
68. The communication system of embodiment 67, wherein:
the processing circuitry of the host computer is configured to execute a host application;
the UE is configured to execute a client application associated with the host application, thereby providing the user data to be received by the host computer.
71. A method implemented in a base station, comprising [steps in base station for preparing/initiating/maintaining/supporting/ending receipt of the transmission from a UE].
75. A method implemented in a communication system including a host computer, a base station and a user equipment (UE), the method comprising:
at the host computer, receiving, from the base station, user data originating from a transmission which the base station has received from the UE, wherein the UE [steps in base station for preparing/initiating/maintaining/supporting/ending receipt of a transmission from the UE].
76. The method of embodiment 75, further comprising:
at the base station, receiving the user data from the UE.
77. The method of embodiment 76, further comprising:
at the base station, initiating a transmission of the received user data to the host computer.

The invention claimed is:

1. A method for link aggregation of a plurality of communication links, the plurality of communication links comprised in an Aggregation Group (AG), the method comprising a communication arrangement:
implementing link aggregation of the plurality of communication links in the AG for a plurality of data flows, each data flow comprising a succession of data segments, by transmitting each successive data segment of a given data flow via any available link of the aggregated communication links;
for each of a plurality of data flows, obtaining data segments to be transmitted;
for a certain data segment,
identifying a subset of available communication links, out of the plurality of communication links, which are available for transmission of the certain data segment within a current time period;
if a communication link used for transmission of a most recently transmitted data segment of a certain data flow comprising the certain data segment is in the subset of available communication links, selecting that communication link, and otherwise, selecting any communication link comprised in the subset of available communication links;
determining a risk of reordering of data segments within the certain data flow, where the risk is associated with transmitting the certain data segment via the selected communication link, based on its link characteristics; and
buffering the certain data segment until the risk of reordering satisfies a predetermined criteria, prior to transmitting the certain data segment via the selected communication link.

2. The method of claim 1, further comprising detecting one or more data flows in the obtained data segments.

3. The method of claim 2, wherein the detecting comprises determining a hash checksum based on a predetermined section of each data segment, wherein a flow is identified by a respective hash checksum.

4. The method of claim 1:
wherein the selecting comprises maintaining a transmit Flow Identity Table (tFIT) comprising Flow Identities (FI) associated with the identified flows, corresponding communication link identifiers (LID), Delivery Time Stamps (DTS), and Segment Size values (SS);
wherein the LIDs are used for identifying the previous communication link used for transmission of the most recently transmitted data segment associated with each FI out of the plurality of communication links;
wherein the DTS are time-stamps indicating when in time the last segment was transmitted; and
wherein the SS values indicate the data size of the most recently transmitted data segment of the corresponding flow.

5. The method of claim 4, wherein the DTS value is determined based on a common clock, wherein all communication links are arranged to receive the common clock.

6. The method of claim 1, wherein the link characteristics comprise link latency, link bandwidth, and/or link throughput.

7. The method of claim 1, wherein the link characteristics are configured to be static.

8. The method of claim 1:
wherein the link characteristics are dynamic; and
wherein the determining comprises updating link characteristics associated with the selected communication link.

9. The method of claim 1, wherein the determining comprises maintaining a Link Characterization Table comprising status information associated with each communication link in the plurality of communication links.

10. The method of claim 9, wherein the status information comprises Link Latency, Link Capacity, and/or flow control information indicating if a communication link is available for transmission of a data segment.

11. The method of claim 1, wherein the determining comprises determining an Estimated Time of Arrival associated with a previously transmitted data segment.

12. The method of claim 1:
wherein the plurality of communication links comprises one or more radio communication links; and
wherein the communication arrangement comprises a traffic handling unit and a communication link interface for each communication link.

13. A communication arrangement adapted for link aggregation of a plurality of communication links, the plurality of communication links comprised in an Aggregation Group (AG), the communication arrangement configured to communicate via the plurality of communication links, the communication arrangement comprising:
a traffic handling unit, the traffic handling unit comprising processing circuitry and memory containing instructions executable by the processing circuitry whereby the traffic handling unit is operative to:
implement link aggregation of the plurality of communication links in the AG for a plurality of data flows, each data flow comprising a succession of data segments, by transmitting each successive data segment of a given data flow via any available link of the aggregated communication links;
for each of a plurality of data flows, obtain data segments to be transmitted;
for a certain data segment,
identify a subset of available communication links, out of the plurality of communication links, which are available for transmission of the certain data segment within a current time period;

if a communication link used for transmission of a most recently transmitted data segment of a certain data flow comprising the certain data segment is in the subset of available communication links, select that communication link, and otherwise, select any communication link comprised in the subset of available communication links;

determine a risk of reordering of data segments within the certain data flow, where the risk is associated with transmitting the certain data segment via the selected communication link, based on its link characteristics; and buffer the certain data segment until the risk of reordering satisfies a predetermined criteria, prior to transmitting the certain data segment via the selected communication link.

14. The communication arrangement of claim 13, wherein the instructions are such that traffic handling unit is operative to detect one or more data flows in the obtained data segments.

15. The communication arrangement of claim 14, wherein the instructions are such that traffic handling unit is operative to detect the one or more data flows by determining a hash checksum based on a pre-determined section of each data segment, wherein a flow is identified by a respective hash checksum.

16. The communication arrangement of claim 13:

wherein the instructions are such that traffic handling unit is operative to select the certain communication link by maintaining a transmit Flow Identity Table (tFIT) comprising Flow Identities (FI) associated with the identified flows, corresponding communication link identifiers (LID), Delivery Time Stamps (DTS), and Segment Size values (SS);

wherein the LIDs are used for identifying the previous communication link used for transmission of the most recently transmitted data segment associated with each FI out of the plurality of communication links;

wherein the DTS are time-stamps indicating when in time the last segment was transmitted; and wherein the SS values indicate the data size of the most recently transmitted data segment of the corresponding flow.

* * * * *